June 13, 1939. J. I. LINER 2,161,965
WINDSHIELD WIPER ARM
Filed Feb. 26, 1937
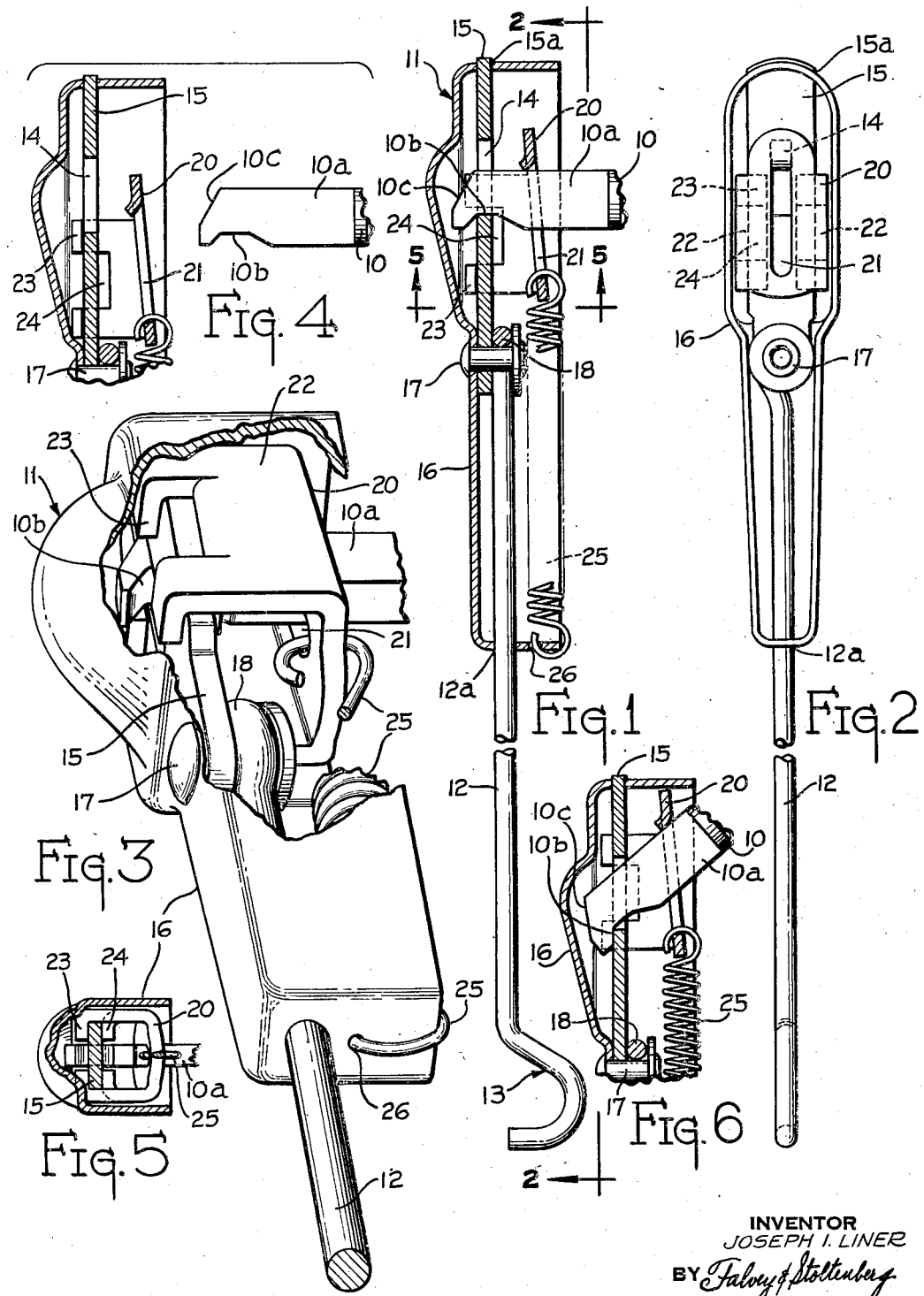
INVENTOR
JOSEPH I. LINER
BY *Falvey & Stoltenberg*
ATTORNEYS Patented June 13, 1939

2,161,965

UNITED STATES PATENT OFFICE 2,161,965

WINDSHIELD WIPER ARM

Joseph I. Liner, Toledo, Ohio, assignor to The Orion Electric Company, Wilmington, Del., a corporation of Delaware Application February 26, 1937, Serial No. 127,825

4 Claims. (Cl. 15—255)

This invention relates to windshield wipers, more particularly to a windshield wiper arm.

This invention contemplates the provision of a windshield wiper, the arm of which is adapted to drive a squeegee across the surface of the glass of a windshield, and which may be attached to the oscillating driver shaft of a wiper motor of any suitable type such as, for example, an electric motor, without the use of any tools. The wiper arm contemplated is a compact unit in which all the essential parts are mounted closely together in operable juxtaposition so that the arm may be placed in position on the driver shaft by an unskilled person with a minimum of annoyance.

It is, therefore, an object of this invention to provide a windshield wiper arm that may be attached to and detached from a driver shaft without the use of any tools.

It is a further object of this invention to provide a windshield wiper arm adapted for convenient attachment to a driver shaft in which the means for creating a lateral thrust on the wiper arm to hold the squeegee in close contact with the glass, are held together in convenient juxtaposition to allow the wiper arm to be attached to the driver shaft without having the parts separating and causing inconvenience.

It is a further object of this invention to provide a connecting mechanism between a motor and a windshield squeegee, in which the power is transmitted by conforming non-circular parts which are adapted for connection together by simple operations without the use of tools, and at the same time allow limited relative movement between the parts so that the squeegee may be lifted from the windshield for cleaning the glass thereof without separating the parts of the connecting mechanism.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is a sectional elevational view, showing the wiper arm in operable position on a driver shaft.

Figure 2 is a view taken along the line 2—2 of Figure 1 with parts omitted to show the alignment of the non-circular apertures.

Figure 3 is a perspective view, partly cut away, showing details of the construction.

Figure 4 is a sectional elevational view, showing the arm in detached relation.

Figure 5 is a view taken along the line 5—5 of Figure 1.

Figure 6 is a sectional elevational view, showing an angular displacement of the parts.

Referring to the drawing, particularly to Figure 1, there is shown a driving shaft 10 which has a non-circular terminus 10A to which a unitary connection, indicated generally by 11, is attached for driving a windshield wiper arm 12. A motor of any desirable design (not shown) may be provided to drive the shaft 10, preferably a motor having an oscillatory motion will be used. The windshield wiper arm 12 is provided at its lower end by any convenient device such as, for example, a hook 13 to which a squeegee (not shown) is attached to cooperate with a windshield (also not shown) to clean the same.

The shaft 10 and its non-circular terminus 10A provides a driving member which cooperates with a conforming non-circular aperture 14 in a driven member 15, preferably in the nature of a plate. The driven member 15 and the wiper arm 12 are provided with a casing 16; the driven member 15 and the wiper arm 12 being attached thereto by any convenient means as, for example, by a rivet 17 which threads through an aperture in the driven member 15 and an eye 18 formed on the end of the wiper arm 12. The wiper arm 12 and the driven member are further held in position within the casing by means of apertures in the sides of the casing cooperating with the respective parts. An aperture 15A is provided at the upper end of the casing, being generally in the shape of rectangle to conform with the dimensions of the driven member 15, while on the opposite end of the casing, a circular opening 12A is provided to cooperate with the circular cross-section of the wiper arm 12.

A third member 20 is provided to cooperate with the non-circular terminus 10A and is adapted to move in a plane parallel with and displaced from the driven member 15. A non-circular aperture 21 is provided in the third member 20 which is adapted to embrace and to conform to the non-circular terminus 10A of the driving shaft. Depending sides 22 are provided to form a channel-shaped structure, the upper ends of the sides of the channel being provided with inwardly struck tongues 23 which cooperate with one side of the driven member 15. Each depending side of the channel-shaped member is also provided with a second inwardly struck tongue 24 which is adapted to engage the opposite side of the driven member 15 than that which is engaged by the tongues 23. In this manner, a guide means is formed for the channel-shaped structure between the tongues 23 and 24 which allows the third member 20 to slide in parallel juxtaposition in a longitudinal direction with the driven member 15.

The aperture 14 in the driven member 15 and the aperture 21 in the third member 20 may be aligned as is clearly shown in Figure 2 so that the non-circular terminus 10A of the driving shaft 10 may be threaded through both, the conforming sides of the apertures and the non-circular terminus 10A forming a driving connection between the shaft 10 and the wiper arm 12.

To keep the apertures 14 and 21 out of alignment as shown in Figure 4, a resilient means in the nature of a helical spring 25 is provided which is attached by a loop at the one end to the third member 20 by engaging the aperture 21 while the opposite end is provided with a loop which is threaded in an aperture 26 in the end of the casing. The helical spring 25 at all times urges the third member 20 toward the rivet 17 which with the casing acts as a stop means to limit the movement of the third member 20.

The wiper arm is placed in operable position on the driver shaft 10 by first threading the non-circular terminus 10A through the aperture 21 in the third member 20, and then applying a force to the casing 16 in a direction to align the apertures 21 and 14 which will allow the non-circular terminus 10A to thread the aperture 14 and assume the position shown in Figure 1.

To hold the wiper arm in operable position on the driver shaft 10, a notch 10B is provided on the lower side of the non-circular terminus 10A of the shaft, the slot being provided with oblique sides which will allow the driven member 15 to oscillate about the bottom of the slot. Due to the action of the resilient means 25 on the third member 20, the slot 10B will at all times during normal operation cooperate with the bottom of the slot 10B substantially as shown in Figures 1 and 6.

The tension of the resilient means 25 acting through the third member 20 at a point displaced from the point of cooperation between the slot 10B and the aperture 14 will give rise to a moment tending to turn the wiper arm 12 in a counter-clockwise direction as shown in Figure 1, assuming that the shaft 10 remains fixed. This tension normally thrusts the squeegee, which is attached to the hook 13, against the glass of the windshield (not shown) to assure an efficient cleaning operation.

Referring to Figure 6, the angular displacement from normal, which may be obtained between the shaft 10 and the driven member 15, is shown before there will be a tendency for the parts to become disengaged. For convenience in illustrating, the shaft 10 has been displaced, however, under normal circumstances, the shaft 10 would remain fixed and the driven member 15, with its wiper shaft 12, would be displaced until the driven member 15 engages the oblique side of the slot 10B. This action further advances the third member 20 along the driven member 15 and increases the tension upon the resilient means 25. To prevent the non-circular terminus 10A from engaging the casing, a chamfer 10C is provided at its forward end. During the use of the wiper arm, this angular displacement between the driven member 15 and the shaft 10 is often necessary. For example, when an operator is cleaning the windshield, it is necessary to lift the squeegee and the wiper arm 12 from the surface of the glass to facilitate the cleaning operation.

To remove the wiper arm from the shaft, it is necessary to reverse the operation of attaching. In other words, a downward force is applied to the wiper arm in Figure 1 to advance the non-circular terminus 10A upwardly in the aperture 14 so that the aperture may be disengaged from the slot 10B. Then by pulling outwardly (to the left in Figure 1), the non-circular terminus 10A of the shaft may be removed from the threading relation with the apertures 14 and 21 and so remove the device from the shaft 10. This will allow the resilient means 25 to pull the third member 20 to the position shown substantially in Figure 4.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In a windshield wiper arm, a non-circular driving member, a driven member having a non-circular aperture to cooperate with the non-circular driving member adapted to allow relative movement in a predetermined plane and to transmit power between the driving member and the driven member, slidable guide means on the driven member having a portion adapted for longitudinal movement in spaced relation with the driven member, said portion being provided with an aperture to embrace the driving member at a point displaced from the point of cooperation between the driving member and the driven member, and resilient means acting between the guide means and the driven member tending to pull the apertures in the guide means and the driven member out of alignment whereby a turning moment is created tending to move the driven member in the predetermined plane.

2. In a device of the class described, a non-circular driving member, a driven member with a non-circular aperture to cooperate with the driving member and adapted to transmit power therebetween, a sliding plate cooperating with the driven member and adapted to move in spaced parallel relation therewith and provided with an aperture to embrace the driving member in longitudinal spaced relation with the non-circular aperture on the driving member, means to restrain disengagement of the driving member from the driven member, and resilient means acting to keep the apertures in the driven member and the sliding plate out of alignment to create a moment tending to rotate the driven member.

3. In a device of the class described, a casing, a non-circular driving member projecting into the casing, a wiper arm extending from the casing, a driven member in the casing with a non-circular aperture to cooperate with the non-circular driving member to transmit power therebetween, a channel-shaped member cooperating with the driven member, the side members of the channel-shaped member being adapted to slide longitudinally thereon to move the base thereof in spaced parallel relation with the driving member, an aperture in the base of the channel-shaped member to embrace the driving member, resilient means acting on the channel-shaped member to restrain the alignment of the apertures in the driven member and the base of the channel-shaped member to create a turning moment tending to rotate the wiper arm with reference to the driving member, and means to restrain disengagement of the driving member from the driven member.

4. The device defined in claim 3 further characterized by having the casing, the driven member and the wiper arm held as a unit by a single rivet.

JOSEPH I. LINER.